United States Patent
Thomas et al.

(10) Patent No.: US 11,858,583 B2
(45) Date of Patent: Jan. 2, 2024

(54) BICYCLE COMPONENT TUBE

(71) Applicant: SRAM, LLC, Chicago, IL (US)

(72) Inventors: Christopher Thomas, Colorado Springs, CO (US); Josh Lau, Monument, CO (US); Sarah Blakeslee, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 1004 days.

(21) Appl. No.: 16/707,489

(22) Filed: Dec. 9, 2019

(65) Prior Publication Data

US 2021/0171149 A1   Jun. 10, 2021

(51) Int. Cl.
  *C22F 1/047*  (2006.01)
  *B62K 21/02*  (2006.01)
  *B62K 19/06*  (2006.01)

(52) U.S. Cl.
  CPC .............. *B62K 19/06* (2013.01); *B62K 21/02* (2013.01); *C22F 1/047* (2013.01)

(58) Field of Classification Search
  CPC .......... B62K 19/28; B62K 21/02; C22F 1/047
  See application file for complete search history.

(56) References Cited

U.S. PATENT DOCUMENTS

| 5,016,895 | A | * | 5/1991 | Hollingsworth | B62K 21/02 264/258 |
| 5,078,417 | A | * | 1/1992 | Mouritsen | B62K 21/02 264/258 |
| 5,129,665 | A | * | 7/1992 | Sutter | B62K 21/18 280/281.1 |
| 5,364,115 | A | * | 11/1994 | Klein | B62K 21/02 280/281.1 |
| 5,762,352 | A |  | 6/1998 | Lee | |
| 6,352,276 | B1 | * | 3/2002 | Hill | B62K 21/02 280/279 |
| 6,418,770 | B1 |  | 7/2002 | Binno | |
| 7,207,585 | B2 | * | 4/2007 | Czysz | B62K 21/20 180/219 |
| 7,543,835 | B2 | * | 6/2009 | Murphy | B62K 21/04 280/275 |
| 7,597,338 | B2 |  | 10/2009 | I et al. | |
| 7,950,681 | B2 | * | 5/2011 | Lewis | B62K 21/02 280/279 |
| 8,066,295 | B1 |  | 11/2011 | Cusack | |
| 8,083,246 | B2 | * | 12/2011 | White | B62K 21/02 280/279 |

(Continued)

FOREIGN PATENT DOCUMENTS

CN   1919683 A   2/2007
CN   201165302 Y   12/2008

(Continued)

*Primary Examiner* — Kevin Hurley
*Assistant Examiner* — Hosam Shabara

(57) ABSTRACT

A bicycle subassembly includes a bicycle component having a socket and a tube having a first tube portion received in the socket and a second tube portion extending outwardly from the socket. The tube includes a cold worked region spanning at least a portion of the first tube portion and at least a first portion of the second tube portion. The tube includes a non-cold worked region spanning at least a second portion of the second tube portion. Methods for making the tube and subassembly are also provided.

20 Claims, 7 Drawing Sheets

(56) References Cited

U.S. PATENT DOCUMENTS

| | | | |
|---|---|---|---|
| 8,181,979 B2 * | 5/2012 | Achenbach | B62K 25/08 |
| | | | 188/297 |
| 8,936,236 B2 | 1/2015 | Nakano et al. | |
| 8,973,810 B2 | 3/2015 | Sutherlin et al. | |
| 9,039,023 B2 * | 5/2015 | Toda | B62K 25/08 |
| | | | 280/279 |
| 9,051,022 B2 * | 6/2015 | Galasso | B62K 21/02 |
| 2007/0257466 A1 | 11/2007 | Murphy | |
| 2008/0303240 A1 | 12/2008 | Lewis et al. | |
| 2012/0091683 A1 | 4/2012 | Mcandrews | |
| 2014/0125033 A1 * | 5/2014 | White | B62K 19/16 |
| | | | 280/279 |
| 2014/0265225 A1 | 9/2014 | D'Aluisio | |

FOREIGN PATENT DOCUMENTS

| | | | |
|---|---|---|---|
| CN | 104494766 A | | 4/2015 |
| CN | 206528576 U | | 9/2017 |
| GB | 507202 | | 6/1939 |
| KR | 20200083888 A | * | 7/2020 |
| TW | 510335 U | | 11/2002 |
| TW | 200617310 A | | 6/2006 |

\* cited by examiner

FIG. 2
FIG. 3
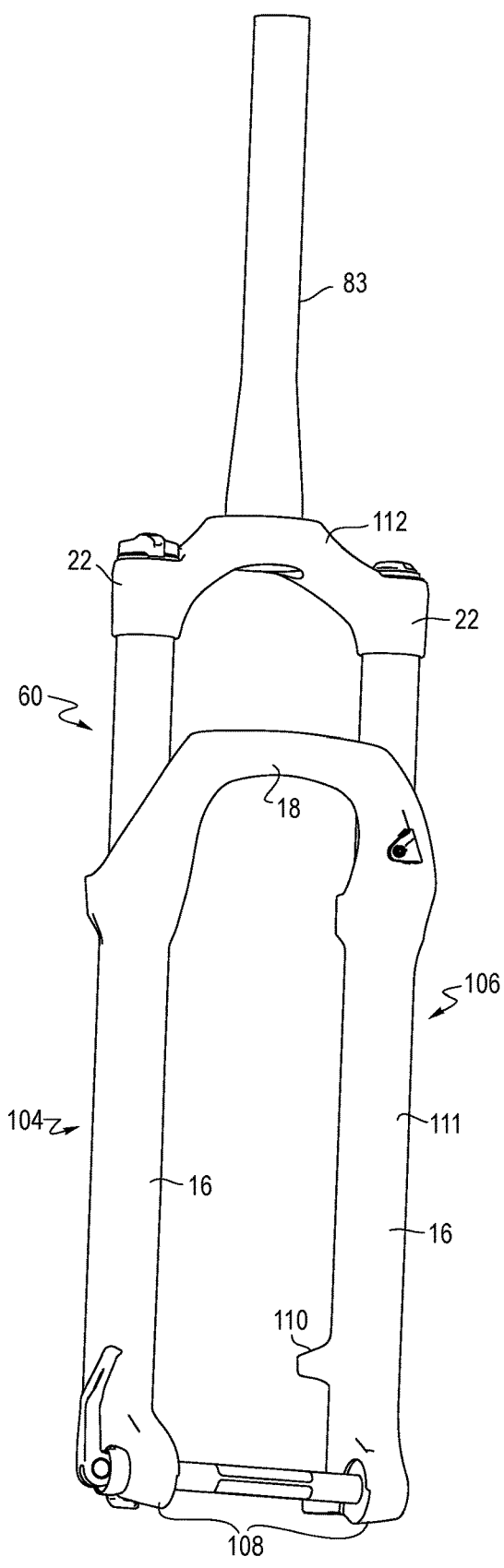
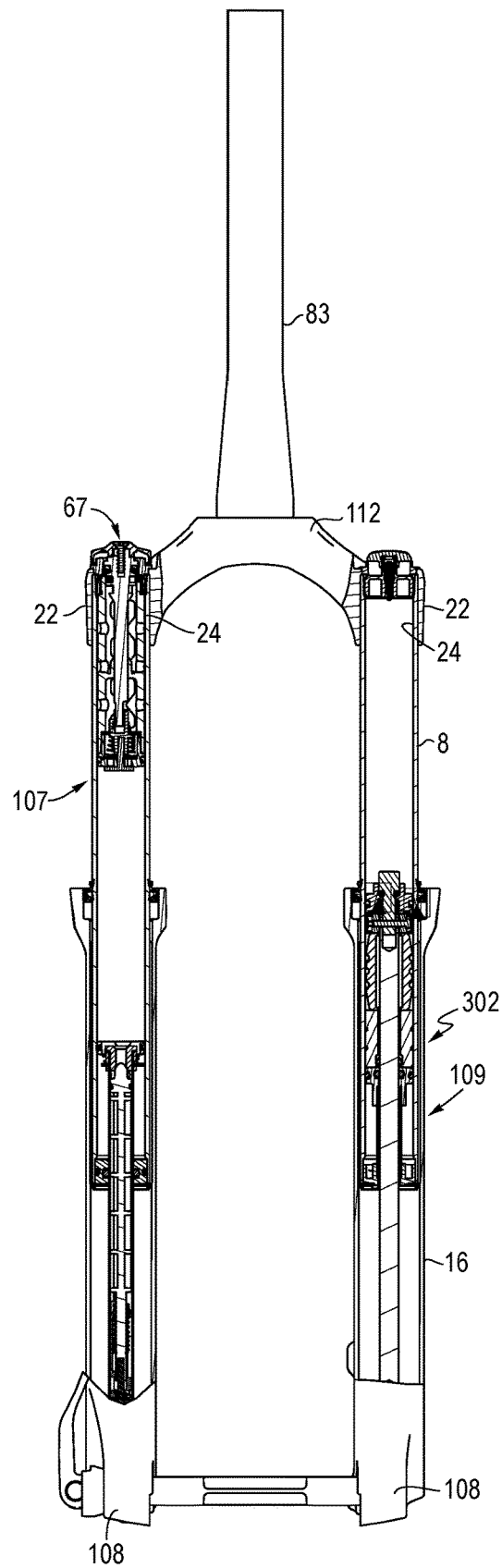

BICYCLE COMPONENT TUBE

FIELD OF THE DISCLOSURE

The present application generally relates to a bicycle subassembly having a tube with first and second portions having different material properties, including for example different residual compressive stresses.

BACKGROUND

Bicycles are known to have various subassemblies, including for example suspension components. Suspension components have been used for various applications, such as cushioning impacts, vibrations, or other disturbances experienced by the bicycle during use. A common application for suspension components on bicycles is for cushioning impacts or vibrations experienced by the rider when the vehicle is ridden over bumps, ruts, rocks, pot holes and/or other obstacles. These suspension components include rear and/or front wheel suspension components. Suspension components may also be used in other locations, such as a seat post or handlebar, to insulate the rider from impacts.

Often, the suspension components may include a tube, for example an upper tube on a front fork, which interfaces with other components including for example a crown and/or a lower tube. One or more tubes also may be incorporated into other bicycle subassemblies, including various frame, drive train, seating and headset assemblies. During use, the one or more tubes may be exposed to repeated/cyclical bending loads, and the associated compressive/tensile stresses associated therewith. Over time, the repetitive stresses introduced by the cyclical loading, and in particular tensile stresses associated therewith at an outer surface of the tube, may make the tube more susceptible to fatigue crack propagation. At the same time, however, techniques for mitigating the susceptibility of the tube to fatigue may result in other portions of the tube being less suitable for other applications. For example, the surface of tube may be less suitable for a sliding interface between the tube and another component.

SUMMARY

In one aspect, one embodiment of a front fork assembly for a bicycle includes a front fork crown having a socket and a tube having an end portion received in the socket. The end portion and the socket have an overlapping region defined by a first length. The end portion of the tube has a cold worked region including the overlapping region, with the cold worked region having a second length that is greater than the first length. The tube has an overall third length that is greater than the second length.

In another aspect, one embodiment of a bicycle subassembly includes a bicycle component having a socket and a tube having a first tube portion received in the socket and a second tube portion extending outwardly from the socket. The tube includes a cold worked region spanning at least a portion of the first tube portion and at least a first portion of the second tube portion. The tube includes a non-cold worked region spanning at least a second portion of the second tube portion.

In yet another aspect, one embodiment of a bicycle subassembly includes a bicycle component having a socket and a tube having a first tube portion received in the socket and a second tube portion extending outwardly from the socket. In one embodiment, the tube is unitary, with the first and second portions being integrally formed. The tube includes a first region having a first material property extending over at least a portion of the first tube portion and at least a first portion of the second tube portion. The tube includes a second region having a second material property extending over at least a second portion of the second tube portion. The first and second material properties are different. In one embodiment, the first and second material properties are first and second residual compressive stresses at the outer surface of the tube.

In yet another aspect, a method of manufacturing a bicycle component subassembly includes cold working a first tube portion of a tube to define a cold worked region while avoiding cold working of a second tube portion of the tube to maintain a non-cold worked region. The method includes inserting the first tube portion into a socket of a bicycle component, wherein at least a first portion of the cold worked region and the socket are overlapping, and wherein at least a second portion of the cold worked region is not overlapping with the socket.

The various embodiments of the bicycle components, the bicycle subassemblies, including the front fork assembly, the bicycle and the methods for the use and assembly thereof provide significant advantages over other bicycle components, subassemblies and methods. For example and without limitation, the fatigue life of the tubing components exposed to bending stresses may be improved by providing or positioning a region or zone of residual compressive stress at the outer surface of the tube, for example by cold working the region or zone. The residual compressive stresses reduce the magnitude and impact of the tensile stresses incurred during bending, thereby increasing the fatigue life of the tubing components. At the same time, portions of the tube may be maintained without the introduction of residual compressive stresses, with the surface finish of those portions being suited for various applications, including for example and without limitation providing a sliding interface with another component.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which:

FIG. 2 is a front perspective view of a front suspension component of a bicycle constructed in accordance with the teachings of this disclosure.

FIG. 3 is a cross-sectional view of the front suspension component shown in FIG. 2.

DETAILED DESCRIPTION OF THE DISCLOSURE

Figure 4:
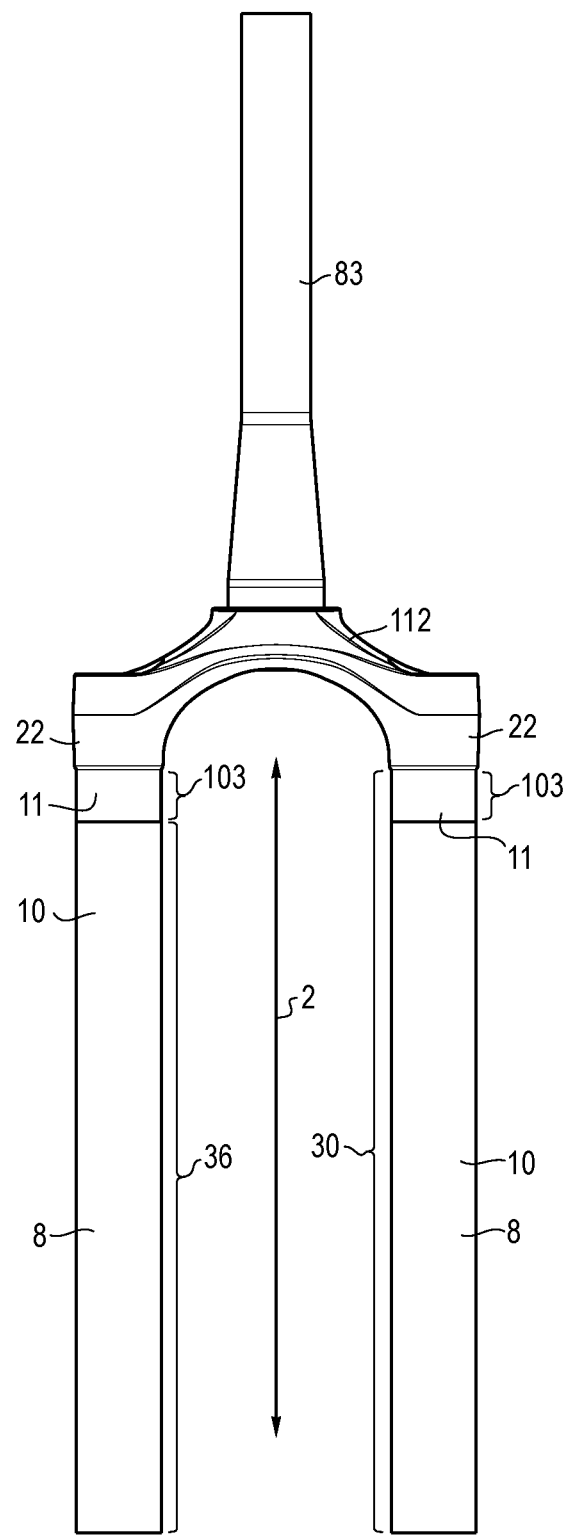
FIG. 4 is a front view of an upper portion of the front suspension component shown in FIG. 1.
Figure 7:
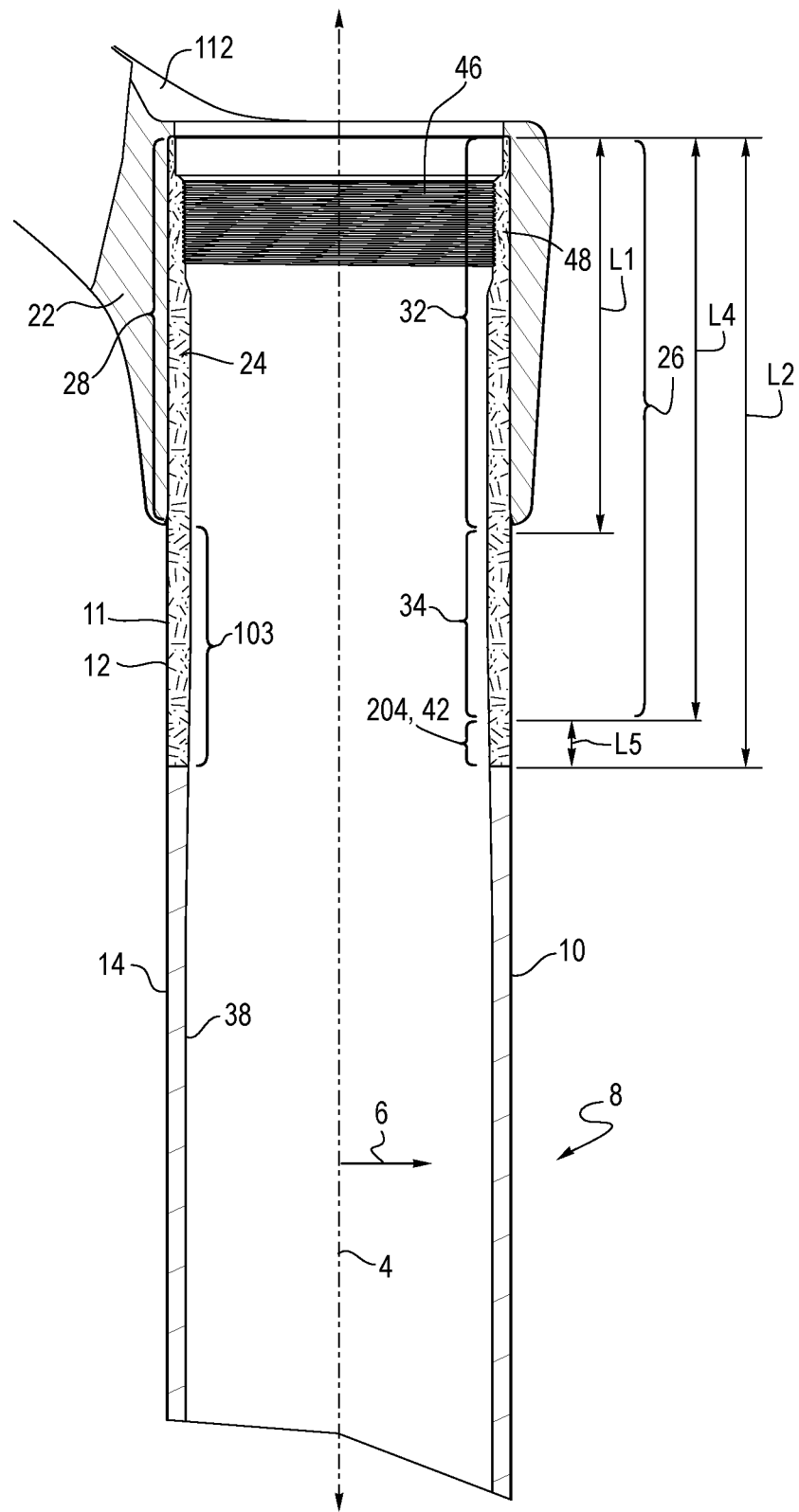
FIG. 7 is a partial, enlarged cross-sectional view showing the interface between a tube and another bicycle component.

It should be understood that the term "plurality," as used herein, means two or more. The term "longitudinal," as used herein means of or relating to a length or lengthwise direction 2, for example a direction running along a length of a tube 8 as shown in FIG. 4, but is not limited to a linear path, for example if the tube is curved or curvilinear. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a central axis 4 of the tube 8 as shown in FIG. 7. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 50.

Figure 1:
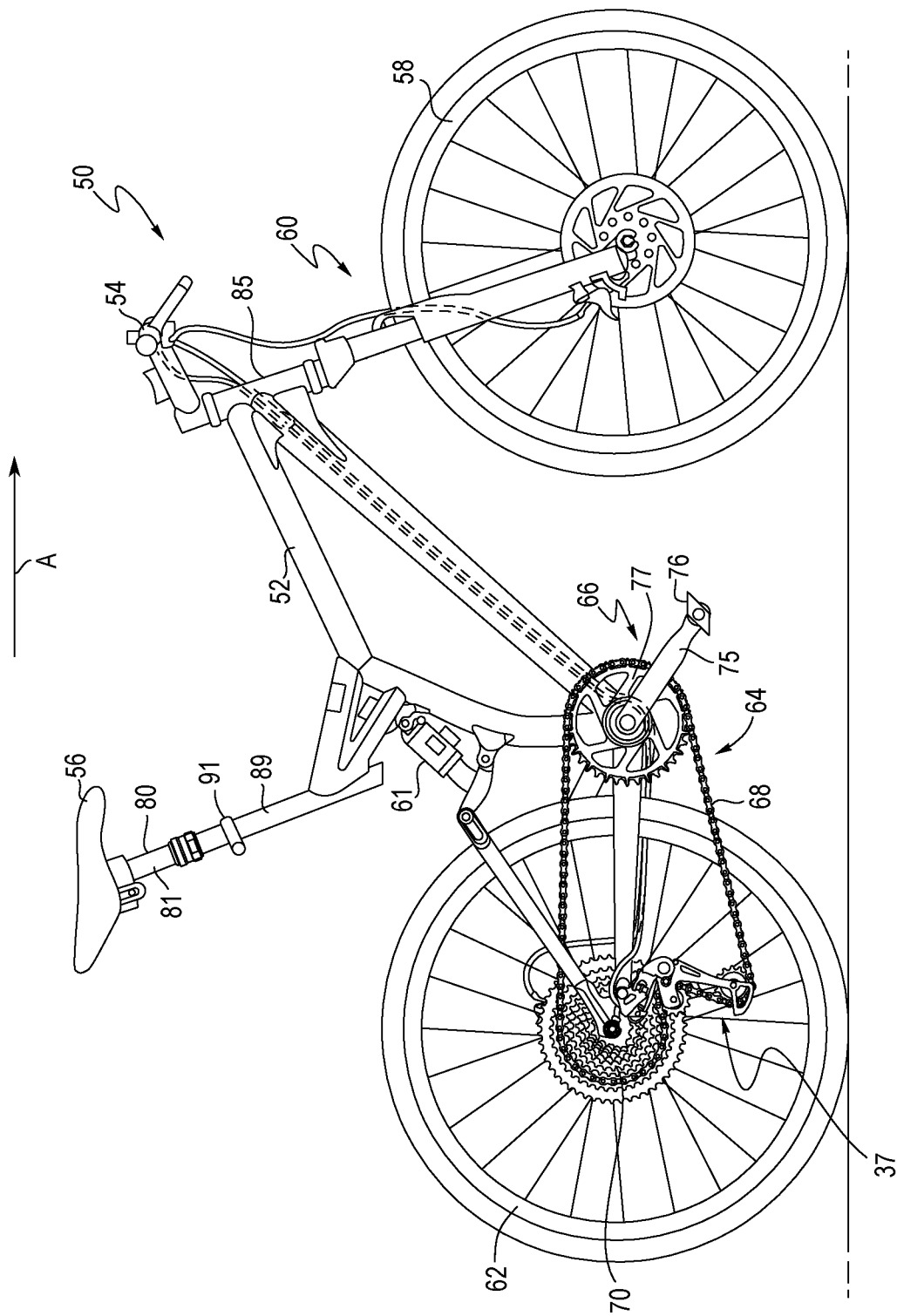
FIG. 1 is a side view of one example of a bicycle.

FIG. 1 illustrates one example of a human powered vehicle on which a bicycle subassembly, shown as a front fork assembly 60, may be implemented. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a front fork subassembly 60 supporting the front end of the frame, the front fork subassembly 60 constructed in accordance with the teachings of the present disclosure. The bicycle 50 also has a second or rear wheel 62 supporting a rear end of the frame 52. The rear end of the frame 52 may be supported by a rear suspension component 61, such as a rear shock. The bicycle 50 also has a drive train 64 with a crank assembly 66 that is operatively coupled via a chain 68 to a rear cassette 70 near the hub providing a rotation axis of the rear wheel 62. The crank assembly 66 includes at least one, and typically two, crank arms 75 and pedals 76, along with at least one front sprocket, or chain ring 77. A rear gear change device 37, such as a derailleur, is disposed at the rear wheel 62 to move the chain 68 through different sprockets of the cassette 70. In one embodiment, a front gear changer device, such as a derailleur, may be provided to move the chain 68 through multiple sprockets of the crank assembly. In the illustrated example, the saddle 56 is supported on a seat post subassembly 80, including a tube 81 having an end portion received in a top of a frame seat tube 89 of the frame, which defines a socket. A clamping ring 91 may be tightened to secure the upper seat tube 81 to the lower frame seat tube 89.

In FIG. 1, the arrow A depicts a normal riding or forward moving direction of the bicycle 50. While the bicycle 50 depicted in FIG. 1 is a mountain bicycle, the front fork assembly 60, including the specific embodiments and examples disclosed herein as well as alternative embodiments and examples, may be implemented on other types of bicycles. For example, the disclosed front fork assembly 60 may be used on road bicycles, as well as bicycles with mechanical (e.g., cable, hydraulic, pneumatic, etc.) and non-mechanical (e.g., wired, wireless) drive systems.

Now referring to FIGS. 2 and 3, the front suspension element, or front fork assembly 60 of FIG. 1, is shown as isolated from the rest of the bicycle. The front fork assembly 60 includes a steering tube 83 configured for attachment to the handlebars 54 and the bicycle frame 52. The front fork assembly 60 also includes at least one leg configured for rotatable attachment to a front wheel. In the displayed embodiment, the front fork assembly 60 includes a first leg 104 and a second leg 106. The at least one leg includes a suspension system. The suspension system may include both a damping system, or damper 107, and a spring system 109. The two systems function together to form the suspension system. In the illustrated embodiment, the first leg 104 includes the damper 107 and the second leg 106 includes the spring system 109, although either leg may include the damper and/or spring system. In an embodiment, a front suspension element may include merely a single leg with a damper and spring included in the single leg.

The first leg 104 and/or the second leg 106 may be constructed of telescoping bars or tubes 8, 16 called stanchions. The first leg 104 and/or the second leg 106 may include an upper tube 8 or stanchion and a lower tube 16 or stanchion. In one embodiment, the lower tubes 16 of both the first leg 104 and the second leg 106 are formed of a single piece lower tube construction, which includes a bridge 18 configured to attach the two lower tubes 16.

The front fork assembly 60 also may include one or more wheel attachment features 108, such as holes or dropouts configured for wheel hub attachment. The front fork assembly 60 may also include brake attachment features 110, configured for attachment to wheel braking devices, such as disk brake calipers. For example, the brake attachment features may include raised protrusions and holes for fastener attachment to the calipers. In an embodiment, such as the illustrated embodiment, the wheel attachment features 108 and the brake features 110 are included on a front fork component that is connected to both legs. For example, the front fork component may be a single piece lower tube construction, or fork lower part 111, which includes the pair of tubes 16. The fork lower part may include wheel attachment features 108 and/or the brake features 110. The single piece lower tube construction may be formed of a single material, such as a magnesium alloy, aluminum alloy, or other materials. In one embodiment, the single piece lower tube construction is formed through a casting processes. Further machining or forming processes may be used to form specific features, shapes, and/or surfaces of the single piece lower tube.

The front fork assembly 60 may also include a piece forming the tops of one or both legs, such as a front fork crown 112. The front fork crown 112 may be formed of a single piece that spans or forms the top of both the first leg 104 and the second leg 106. In one embodiment, the front fork crown is formed of a single material, such as aluminum or other materials. In one embodiment, the front fork crown is formed through a forging processes. Further machining or forming processes may be used to form specific features, shapes, and/or surfaces of the front fork crown, including for example a pair of boss structures 22 defining downwardly opening sockets 20 dimensioned and shaped to receive end portions 24 of the upper tubes 8. The term "socket" refers to a structure interfacing with and capturing the tube, and includes structures partially or entirely surrounding a circumference of the tube, and which may allow for the tube to extend entirely there through such that portions of the tube are exposed on both sides of the socket, or may capture the end portion, for example by way of a bottom wall or shoulder. The end portion 24 provides both an outer surface 10 and inner surface 38.

A steerer tube 83 is secured to a center hub portion 93 of the front fork crown and extends upwardly therefrom in the longitudinal direction 2. The steerer tube 83 is inserted in and coupled to a head tube 85 component of the frame 52 with one or more bearings, otherwise referred to as a headset, which facilitates rotation between the steerer tube 83 and the head tube 85.

The front fork assembly 60 may also include a suspension element control device 67. In one embodiment, the suspension element control device may be attached to, or at least partially integrated with, the front fork crown 112. The suspension element control device 67 is configured to modify, adapt, or otherwise change a state of the suspension system. In the illustrated embodiment the suspension element control device is configured to change an operational state, or one or more operating characteristics, of the damper 107. As shown in FIG. 3, the damper 107 is a mechanical device configured to dissipate energy input to the suspension component due to impact or impulse forces being applied to the suspension component. Various dampers may include hydraulic, mechanical, or pneumatic damping mechanisms, or combinations of mechanical, pneumatic, and/or hydraulic damping mechanisms.

As shown in FIGS. 3-7, in one embodiment of a front fork assembly 60, the end portion 24 of each upper tube 8 is press-fitted into one of the sockets 20 formed in the front fork crown 112. Besides a press/interference fit, or in combination therewith, the tube 8 may be coupled to the front fork crown 112 using other techniques, such as by welding, with threads and/or adhesive, and/or combinations thereof. The end portion 24 has interior threads 46 that are threadably engaged by a cap 44, or actuator housing, having exterior threads. The inner surface of the end portion may include a step portion 48 disposed radially outwardly from the inner surface 38 of a main tubular wall, with step portion 48 defining a second tubular wall configured with the interior threads 46 and having an upper annular rim that abuts a shoulder defined by the top of the socket 20 in the front fork crown 112.

The upper tube 8 is preferably made of extruded aluminum tubing, for example 7050 or 6066 aluminum alloy. It should be understood that the tube may be made of other materials, including other metals such as steel or titanium. Standard tubing extrusion, forging and drawing manufacturing processes typically result in neutral or near neutral residual compressive stress at an outer surface 10, 11 of the tube 8, and also the outer surfaces of the upper seat tube 81 and/or steerer tube 83. When exposed to bending loads during use, the outer surface 10 of the tube 8, or the outer surfaces of tubes 81, 83, may experiences relatively high tensile stresses. The tube 8 is a unitary tube, meaning it is a one-piece monolithic tube with any and all portions thereof being integrally formed, for example and without limitation by the extrusion and/or drawing process. While separate unitary tubes may be coupled, for example by welding, threadable engagement, press-fit, and combinations, thereof, the separate tubes joined in such a way do not define an overall unitary tube. As mentioned above, tube 8 is presented as an overall unitary tube. In another embodiment, the tube may be formed from multiple pieces joined or merged to create the overall tube.

The disclosed bicycle subassemblies, including the disclosed front fork assembly 60, seat assembly, and/or the bicycle including the interface between the fork steerer tube and frame, solves or improves upon the above-noted and/or other problems and disadvantages with existing and prior known subassemblies. For example, the disclosed front fork assembly 60 includes the tube 8 having different material properties, for example different residual compressive stresses at the outer surface 10, 11 of the tube, and at various depths of the tube below the outer surface 11, which can extend the fatigue life of the tube 8 and the front fork assembly 60. In one embodiment, the different residual compressive stresses are introduced by cold working a portion (cold worked region) 12 of the tube 8, while maintaining a remaining portion 14 of the tube in a standard extruded, forged and/or drawn form. In this way, the surface finish of the remaining portion 14 of the outer surface 10 is ideally suited to interface with other components, including for example the lower tube 16. Likewise, regionalized portions of the seat tube 81 and steerer tube 83, which are unitary, may be cold worked to introduce residual compressive stresses, while other portions are maintained in a standard extruded and/or drawn form. The fatigue life of the tube components exposed to bending may be improved by providing the cold worked region, or zone of residual compressive stress, at the outer surface 11 of the tube, and at various inwardly radial depths therefrom. The residual compressive stresses reduce the magnitude and impact of the tensile stresses incurred during cyclical bending, thus increasing the fatigue life of the tubing components, such as the tube 8, upper seat tube 81, and/or steerer tube 83.

In one embodiment, the tube 8 is configured with a first tube portion 28 disposed in the socket 20 and overlapping with the front fork crown 112, and in particular the boss structure 22. Due to the limited length (L1) of the overlap between the crown socket 20 and the tube portion 28, the end portion 24 may experience relatively large bending stresses, with the largest bending stress typically experienced just below the overlapping front fork crown press-fit region. A second tube portion 30 extends downwardly from the socket 20 and the junction between the tube 8 and front crown 112.

The tube 8 includes a first region 26, defining a connection zone 202, having a first material property extending over at least a first portion 32 of the first tube portion 28 and at least a first portion 34 of the second tube portion 30, and a second region 36 having a second material property extending over at least a portion of the remaining portion 14 of the second tube portion 30.

In one embodiment, the portions 32 and 28 are the same, although it should be understood that the portion 32 may have a length less than the length of the tube portion 28, meaning less than the entire length of the tube portion 28 overlapping with the socket 20 and front fork crown 112 has a material property different than the material property of the standard extruded and/or drawn tube, e.g., the remaining portion 14. In one embodiment, the second region 36 may have a length less than the length of the remaining portion 14. The first and second material properties are different. The phrase "material property" refers to the intensive or physical property of the material that is not dependent on the amount of material. In one embodiment, the first material property is a first residual compressive stress at an outer surface 11 of the tube and the second material property is a second residual compressive stress at the outer surface 10 of the tube. The first and second portions may also have different residual compressive stresses at other depths of the tube extending radially inwardly from the outer surfaces 11, 10. In another embodiment, the tube may have more than the first and second material properties, including for example a gradient material property in a transition portion 42 of the cold worked region 12.

The residual compressive stresses may be introduced through various techniques, including cold working the targeted cold worked region 12 of the tube. One type of cold working is effected by shot peening to induce a degree of cold work to the outer surface 11 of the tubing components, which increases the residual compressive stresses of the material. Other portions of the tube, such as the remaining portion 14, may be selectively cold worked, for example masked to ensure that they are not subjected to the cold working. As such, it is possible to cold work only the cold worked region 12 of the tube exposed to greater bending loads and the associated tensile stresses, with the remainder portion 14 of the tube undergoing only the standard tubing manufacturing processes. In this way, the cold-working process is implemented on a specified region or regions of the upper tubes. It should be understood that the entirety of the tube may be cold-worked in the process of creating a tube work piece using only the standard tubing manufacturing processes. The tube work piece may then be stress relieved during this process such that the tube has relatively low residual stress. As such, the terms "non-cold worked" and "non-cold working," and variations thereof, refer to the state of the tube after this initial formation (i.e., post tube creation), including any stress relief, even if the tube was subjected to earlier cold-working and retains some residual stress. The terms "cold-worked" and "cold-working," and variations thereof, refer to any subsequent/secondary processing and state of the tube to create additional residual stresses post-tube creation. In one embodiment, the cold worked region 12 includes the entirety of the area of the tube portion 28 that mates with the socket 20 and overlaps with the front fork crown 112, the portion 34 below the crown and the additional transitional portion 42. The portions 34 and 42 are collectively referred to as the exposed cold-worked portions 103. In other embodiments, the cold worked region 12 may not include the entirety of the area overlapping with the crown, may not include any portion below the crown and/or may not include any transitional portion.

In another example, residual compressive stresses may be selectively introduced through roller burnishing, the selective location thereof controlled through the disposition of the roller device during the procedure.

The upper tube 8 defines the joint between the lower tube 16 and the front fork crown 112. It may be desirable for the outer surface 10 of the upper tube, or at least the remaining portion 14 thereof, to remain relatively smooth such that the upper and lower tubes 8, 16 experience minimal friction there between as the front fork assembly 60, or legs 104, 106, compresses and extends during travel. Accordingly, in one embodiment, the cold working process is only applied to the upper end 24 of the tube in the cold worked region 12, which includes the portion 28 that is pressed into the crown, and the portions 34, 42 positioned below the crown. As further discussed below, the surface finish of the outer surface 11 of the cold worked region and the outer surface 10 of the non-cold worked region are different, such that the non-cold worked region outer surface 10 is smoother, or less rough, than the outer surface 11 of the cold worked region 12. This roughness differential may be visible to the end user. In other embodiments, the cold worked region 12 or portions thereof, may be processed, for example by burnishing or deep rolling, such that the outer surfaces 10, 11 have the same, or substantially similar finish after anodizing, meaning any differences between the surface finishes are not readily discernable to the naked eye. In one embodiment, the cold work process is applied before anodizing the regionalized location on the tube known to be highly stressed during application usage. After anodizing, the tubes 8 are then pressed into the mating parts, for example the front fork crown 112.

Various types of cold working the tube may be implemented, including shot peening, laser peening, cold rolling, cold forging, deep rolling, swaging and/or roller burnishing, which may be applied to specified regions of the tube and thereby impart residual compressive stresses leading to the higher overall bending fatigue life.

Figure 5:
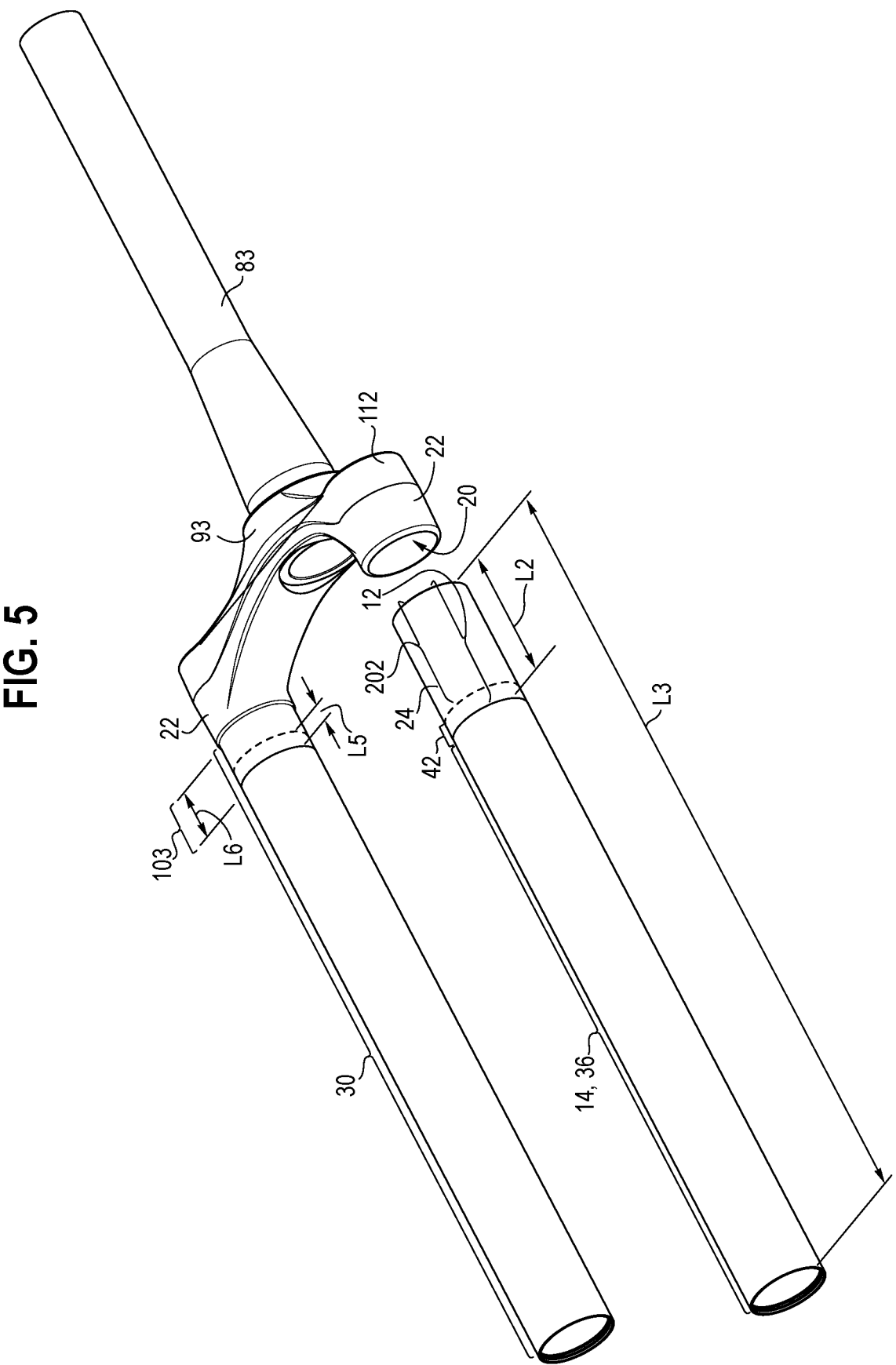
FIG. 5 is a partially exploded view of the upper portion shown in FIG. 4.
Figure 6:
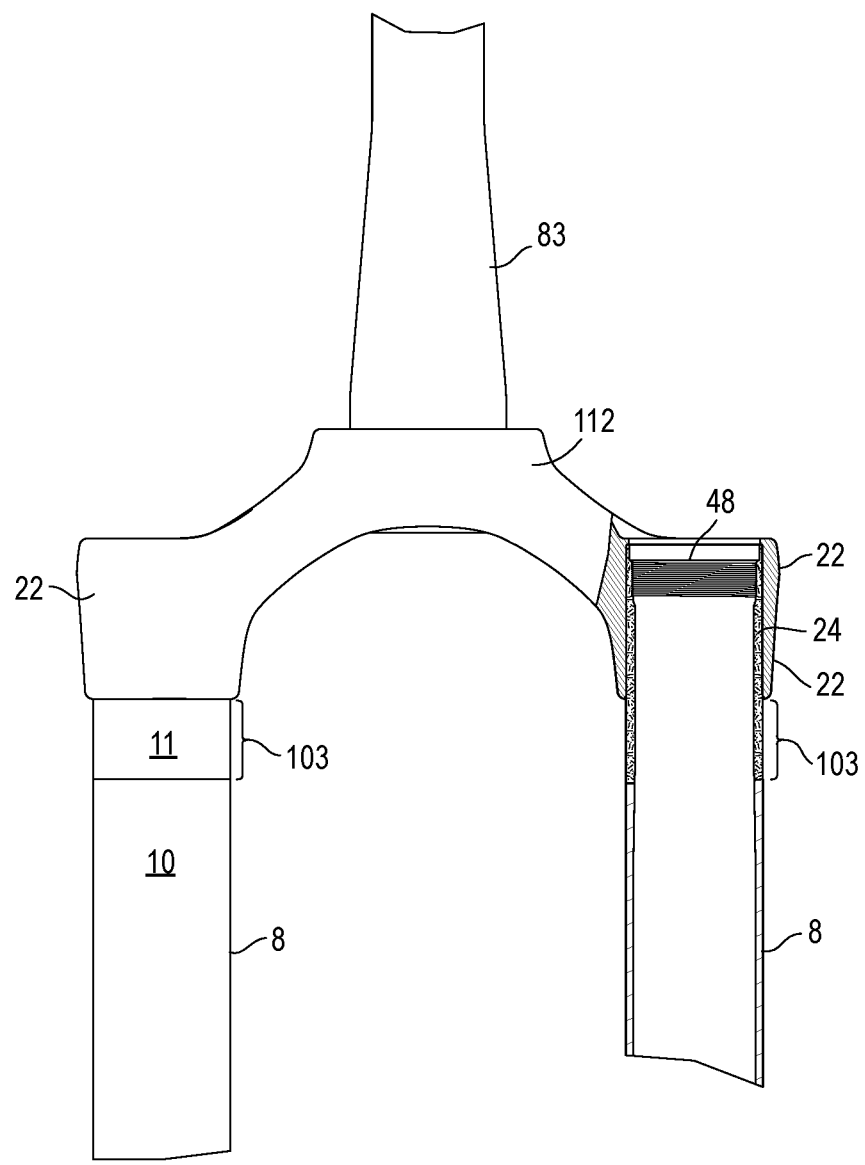
FIG. 6 is a partial cross-sectional view of the upper portion shown in FIG. 4.

The portion 28 overlapping with the socket 20 is defined by the first length (L1). The end portion 24 of the tube includes a cold worked region 12 having a second length (L2). As shown in FIGS. 5 and 7, the second length (L2) is greater than the first length (L1), with the entirety of the overlapping region being cold worked. As mentioned, it should be understood that only a portion of the overlapping region may be cold worked, for example at the interface between the bottom rim of the crown and the upper tube. The tube has an overall third length (L3) that is greater than the second length (L2).

In one embodiment, the non-cold worked region 36 is adjacent the cold worked region 12. In one embodiment, the non-cold worked region 36 extends for the remaining length of the tube, which is the difference between the third and second lengths (L3-L2). It should be understood that, in other embodiments, additional regions of the tube, separate from the cold worked region 12, may also be cold worked, for example at the interface with the lower tube, or along a lower end thereof. The cold worked region 12 includes a connection zone 202 and a transition zone 204. The transition zone 204 is defined by the transition portion 42 of the tube 8 in one embodiment. The connection zone 202, which includes the region 26, includes residual compressive stress at the outer surface 11 of the tube. For example, the connection zone 202 may have a uniform residual compressive stress at an outer surface 11 of the tube. In another example, variable or compressive strength value gradients may also be introduced in zones.

In one embodiment, the connection zone 202 has a fourth length (L4) greater than the first length (L1) and less than the second length (L2). The transition zone 204 has a gradient residual compressive stress defined along a fifth length (L5) of the tube at the outer surface of the tube. In one embodiment, the fifth length (L5) is equal to the difference between the second and fourth lengths (L2-L4). The gradient residual compressive stress transitions from the uniform residual compressive stress of the connection zone 202 at an outer surface 11 to a residual compressive stress of the non-cold worked second region 36 at the outer surface 10 of the tube 8, which may be approximately zero (0), or slightly negative, in one embodiment. The gradient may be linear or non-linear, for example defined by a curve shaped concave up or down, including an exponential function. In one embodiment, the cold worked region 12 extends below a bottom rim of the front fork crown 112, or crown joint, a distance (L6) of between 5 mm and 20 mm, or a length equal to the difference between L2 and L1. Stated another way, in one embodiment, the second length (L2) is at least 5 mm greater than the first length (L1), or between 5 mm and 20 mm greater than the first length (L1).

Figure 8:
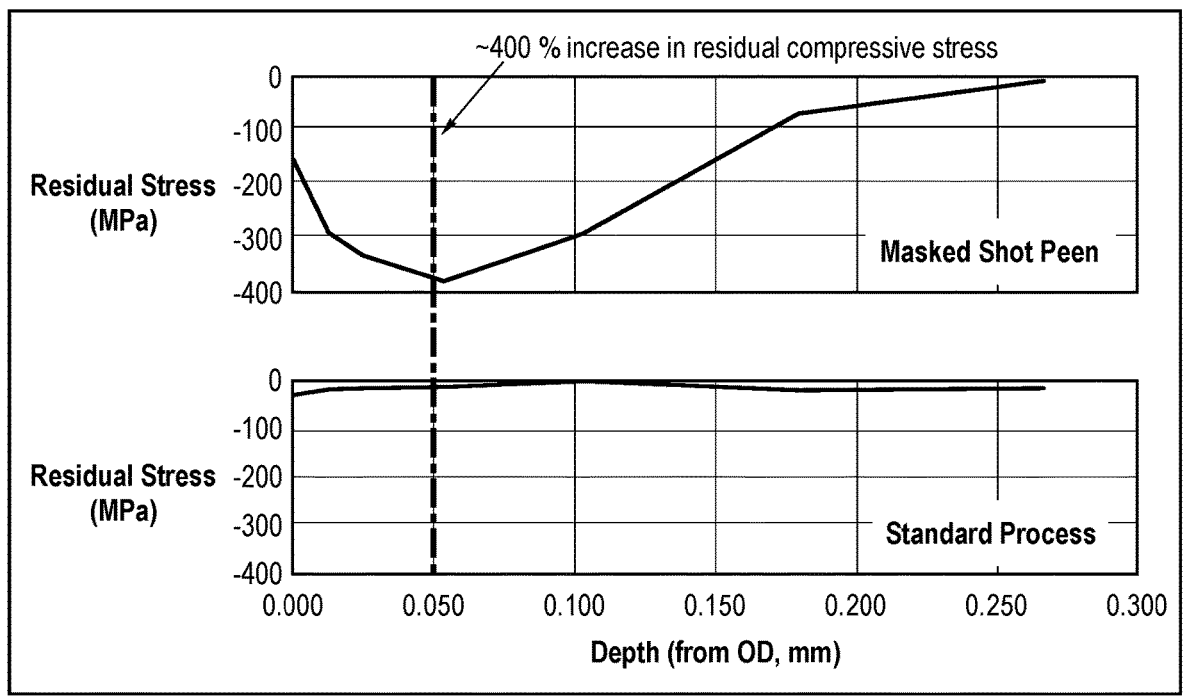
FIG. 8 is a table illustrating residual compressive stresses of a cold-worked tube region compared to a non-cold worked region of a tube.

In this way, a single, unitary tube includes a portion 14 having material properties associated with a standard extrusion tubing process and at least another portion 12 having material properties associated with regionalized cold working, and in particular differing residual compressive stress on a single, unitary tube component, for example at an outer surface 10, 11 thereof and at different radial depths. As shown in FIG. 8, the cold work region 26 of the tube has a ~400× increase in residual compressive stresses compared to the standard tube formation process on the same tube, e.g., the remainder portion 14, or region 36, at a depth of 0.050 mm from the outer surface 10.

The residual compressive stress of the non-cold worked region 36 is slightly negative, or approximately zero at the outer surface 10 of the tube, while the uniform residual compressive stress of the cold worked region 26 is at least minus 100 MPa at the outer surface 10. The residual compressive stress may decrease (have a larger magnitude) the deeper the penetration into the thickness of the tube wall, or displacement radially inwardly, from the outer surface 10. As such, the term "decrease" refers to the value becoming more negative even as the magnitude of the stress increases. For example as shown in FIG. 8, the residual compressive stress may approach minus 400 MPa at a depth of 0.050 mm from the outer surface. The residual compressive stress diminishes (magnitude decreases) and approaches the neutral compressive residual stress at a depth of between 0.25 mm and 0.30 mm. The measurements in FIG. 8 were recorded for samples of both a regionalized cold worked region and a standard extrusion region at four locations: 2 locations 180 degrees apart at an equidistant 40 mm from the respective (cold worked and non-cold worked) ends of the tube 8. Residual stress measurements were taken using x-ray diffraction technique coupled with electrochemical polishing to characterize the following depths from the outer tube surface (mm): 0.0, 0.013, 0.025, 0.05, 0.1, 0.175, and 0.25. Measurements were in adherence to industry standards ASTM E915, ASTM E2860, and SAE HS784.

The regionalized cold-working process improves bending fatigue results by increasing residual compressive stresses at the surface 11 of the material. For example, regionalized shot peening to the upper tube has shown to provide a 6.5× increase in fatigue cycles.

The cold worked region 12, and at least the region 26, has a first roughness at an outer surface 11 of the tube, while the non-cold worked region 36 has a second roughness at the outer surface 10 of the tube. In one embodiment, the first roughness is rougher than the second roughness. In one embodiment, the second roughness has a first value of Ra 0.075 to 0.30 and the first roughness has a first value of Ra 1.475 to 4.080. The second roughness has a second value of Rz 0.75-3.75 and the first roughness has a second value of Rz 7.303-18.504. At least a portion of the cold-worked region has a compressive residual stress of between and including 0 MPa and negative 100 MPa at an outer surface of the tube.

The outer surface 10 of the non-cold worked region 36 defines at least a portion of a sealing surface of the upper tube 8, with the lower end portion of the upper tube 8 inserted into the upper end portion of the lower tube 16. The lower tube 16 is movably engaged, e.g., through sliding, with the outer sealing surface 10.

In one embodiment, a method of manufacturing a bicycle component subassembly, such as the front fork assembly 60, includes cold working portions 32, 34, 42 of the tube 8 to define the cold worked region 12 while avoiding cold working of the tube portion 14 to maintain the non-cold worked region 36, and inserting the first tube portion 32 into the socket 20 of a bicycle component. At least the portion 32 of the cold worked region 12 and the socket 20 are overlapping, and at least the portions 34, 42, collectively portion 103, of the cold worked region 12 are not overlapping with the socket 20. The tube 8 may be masked to provide for the regionalized cold working, and may be further masked to provide for the transition region 204 having a residual compressive stress gradient.

The various embodiments of regionalized cold working, with the differential residual compressive stresses, may be applied to other tubular bicycle components, including without limitation the steerer tube 83 and the seat tube 81.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle subassembly comprising:
a bicycle component comprising a socket; and
a tube having a first tube portion received in the socket and a second tube portion extending outwardly from the socket, wherein the first and second tube portions are integrally formed of a same material, wherein the tube comprises a first region having a first material property extending over at least a portion of the first tube portion and at least a first portion of the second tube portion, and wherein the tube comprises a second region having a second material property extending over at least a second portion of the second tube portion, wherein the first and second material properties are different.

2. The bicycle subassembly of claim 1 wherein the first material property is a first residual compressive stress at an outer surface of the tube and the second material property is a second residual compressive stress at the outer surface of the tube.

3. The bicycle subassembly of claim 2 wherein the first region comprises a cold worked region and wherein the second region comprises a non-cold worked region.

4. The bicycle subassembly of claim 3, wherein the tube comprises a first tube and the non-cold worked region defines a sealing surface of the first tube, and further comprising a second tube movably engaged with the sealing surface.

5. The bicycle subassembly of claim 1, wherein the bicycle component comprises a front fork crown.

6. The bicycle subassembly of claim 3, wherein the cold worked region comprises a connection zone and a transition zone, wherein the connection zone has a uniform residual compressive stress at an outer surface of the tube, and wherein the transition zone has a gradient residual compressive stress defined along a length of the tube at the outer surface of the tube.

7. The bicycle subassembly of claim 6, wherein the gradient residual compressive stress transitions from the uniform residual stress of the connection zone to a residual stress of the non-cold worked region at an outer surface of the tube.

8. The bicycle subassembly of claim 3, wherein the cold worked region has a first roughness at an outer surface of the tube and the non-cold worked region has a second roughness at the outer surface of the tube, wherein the second roughness is different than the first roughness.

9. The bicycle subassembly of claim 8, wherein the second roughness has a first value of Ra 0.075 to 0.30 and a second value of Rz 0.75- 3.75 and the first roughness has a first value of Ra 1.475 to 4.080 a second value of Rz 7.303- 18.504.

10. The bicycle subassembly of claim 3, wherein at least a portion of the cold-worked region has a compressive residual stress of at least minus 100 MPa at an outer surface of the tube.

11. A front fork assembly for a bicycle comprising:
a crown comprising a socket; and
a leg portion formed as a tube having an end portion received in the socket, wherein the end portion and the socket have an overlapping region defined by a first length, wherein the end portion of the tube comprises a cold worked region including the overlapping region and having a second length, wherein the second length is greater than the first length, and wherein the tube has an overall third length, wherein the third length is greater than the second length.

12. The front fork assembly of claim 11, wherein the tube comprises a non-cold worked region adjacent the cold worked region.

13. The front fork assembly of claim 12, wherein the tube comprises an upper tube and the non-cold worked region defines at least a portion of a sealing surface of the upper tube, and further comprising a lower tube movably engaged with the sealing surface.

14. The front fork assembly of claim 11, wherein the cold worked region comprises a connection zone and a transition zone, wherein the connection zone has a uniform residual compressive stress at an outer surface of the tube, wherein the connection zone has a fourth length greater than the first length and less than the second length, and wherein the transition zone has a gradient residual compressive stress defined along a fifth length of the tube at the outer surface of the tube.

15. The front fork assembly of claim 14, wherein the gradient residual compressive stress transitions from the uniform residual stress of the connection zone to a residual stress of the non-cold worked region at the outer surface of the tube.

16. The front fork assembly of claim 15, wherein the residual compressive stress of the non-cold worked region is approximately zero at the outer surface of the tube.

17. The front fork assembly of claim 11, wherein the second length is at least 5 mm greater than the first length.

18. The front fork assembly of claim 12, wherein the cold worked region has a first roughness at an outer surface of the tube and the non-cold worked region has a second roughness at the outer surface of the tube, wherein the first roughness is rougher than the second roughness.

19. The front fork assembly of claim 18, wherein the second roughness has a first value of Ra 0.075 to 0.30 and the first roughness has a first value of Ra 1.475 to 4.080, and, wherein the second roughness has a second value of Rz 0.75- 3.75 and the first roughness has a second value of Rz 7.303- 18.504.

20. The front fork assembly of claim 11, wherein at least a portion of the cold-worked region has a residual compressive stress of at least minus 100 MPa at an outer surface of the tube.

* * * * *